*Porter & Spaulding.*
*Garden Hoe.*

N° 50,305.          Patented Oct. 3, 1865.

Witnesses:
Frederick Curtis.
T. P. Hale Jr.

Inventor:
Roger W. Porter
by his attorney
R. H. Eddy

UNITED STATES PATENT OFFICE.

ROGER W. PORTER, OF NASHUA, AND JACOB F. SPALDING, OF HUDSON, ASSIGNORS TO ROGER W. PORTER, OF NASHUA, NEW HAMPSHIRE.

IMPROVEMENT IN GARDENING IMPLEMENTS.

Specification forming part of Letters Patent No. 50,305, dated October 3, 1865.

*To all whom it may concern:*

Be it known that we, ROGER W. PORTER, of Nashua, and JACOB F. SPALDING, of Hudson, in the county of Hillsborough and State of New Hampshire, have invented an Improved Gardening Implement; and we do hereby declare the same to be fully described in the following specification and represented in the accompanying drawings, of which—

Figure 3:
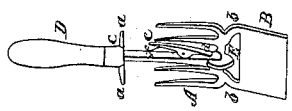
Figure 1:
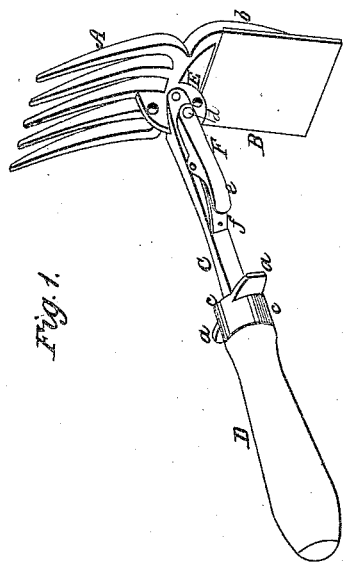
Figure 2:
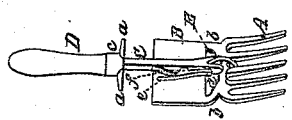

Figure 1 is a perspective view of it with its teeth and blade in positions to enable it to be used either as a hoe or a rake. Fig. 2 is another perspective view of it with its teeth arranged so as to enable the instrument to be employed as a fork. Fig. 3 is another perspective view of it so arranged as to enable the instrument to be employed either as a spade or a scuffle.

In the said drawings, A denotes a series of teeth arranged together like those of a comb, a rake, or a common fork, and having projected from their common junction two arms, $b\ b$, to which is affixed a rectangular plate or blade, B, the whole being formed and arranged as represented. A sectoral projection, E, extending from the middle of the said junction, has a shank, C, hinged or jointed to it, the said shank being forked, so as to receive and embrace the projection. A pin going through the projection and prongs of the fork serves to connect them together and to enable the projection, with its teeth and blade, to be turned one hundred and eighty degrees, or thereabout, on such pin.

The shank C is provided with a handle, D, whose ferrule $c$ has two arms, $a\ a$, extending from it in opposite directions. Furthermore, there is a series of notches or holes made in the curved projection E at or near its edge, such being for the purpose of receiving a lever-latch, F, jointed to the shank, and working through it and into or through the projection E, the said latch consisting of a pin, $d$, a lever, $e$, and a spring, $f$, arranged together and with respect to the shank as shown in the drawings. The said spring, by its action against the lever, serves to keep the pin $d$ in place when it may be within any one of the holes of the projection E. The pin extends from the lever and into the shank and the said projection, and may be moved out of the projection by means of the lever or by pressure made on the tail of the latter.

The arms $a\ a$ serve as guards for the hand of the operator and as supports for the hand while in the act of pressing the instrument into the earth.

The article so made can be used either as a spade, a cork, a hoe, or a rake, the required preparation of it for either of such uses being easily seen by inspection of the drawings. The great utility and advantage of such an implement, particularly for light work, cannot but be apparent to most, if not all, practical gardeners.

What we claim as our invention, and desire to secure by Letters Patent, is—

The fork A, hoe B, projection E, latch F, and pin $d$, when these several parts are arranged in relation to the shank C and for the purpose specified.

ROGER W. PORTER.
JACOB F. SPALDING.

Witnesses:
JAS. W. LYNN,
A. F. STEVENS.